United States Patent
Wendel

(10) Patent No.: US 7,253,929 B2
(45) Date of Patent: Aug. 7, 2007

(54) CAMERA ASSEMBLY FOR A PRINTING PRESS

(75) Inventor: Chris Wendel, Cedarburg, WI (US)

(73) Assignee: Quad/Tech, Inc., Sussex, WI (US)

( * ) Notice: Subject to any disclaimer, the term of this patent is extended or adjusted under 35 U.S.C. 154(b) by 150 days.

(21) Appl. No.: 10/072,376

(22) Filed: Feb. 6, 2002

(65) Prior Publication Data

US 2003/0147101 A1    Aug. 7, 2003

(51) Int. Cl.
*H04N 1/04* (2006.01)
*H01L 27/00* (2006.01)
*G06K 9/00* (2006.01)

(52) U.S. Cl. .................. 358/474; 358/475; 250/208.1; 382/162

(58) Field of Classification Search ............... 358/475, 358/474; 250/208.1; 382/162, 112
See application file for complete search history.

(56) References Cited

U.S. PATENT DOCUMENTS

| | | | |
|---|---|---|---|
| 3,583,807 A | 6/1971 | Pollock | |
| 3,737,226 A | 6/1973 | Shank | |
| 3,920,311 A | 11/1975 | Tsuda et al. | |
| 3,982,116 A | 9/1976 | Sakuma | |
| 4,003,660 A | 1/1977 | Christie, Jr. et al. | |
| 4,130,359 A | 12/1978 | Groner | |
| 4,225,923 A * | 9/1980 | Bloemendaal et al. | 362/301 |
| 4,243,925 A | 1/1981 | Gnuechtel | |
| 4,484,079 A | 11/1984 | Betz et al. | |
| 4,506,152 A * | 3/1985 | Gupta | 250/216 |
| 4,518,249 A * | 5/1985 | Murata et al. | 355/67 |
| 4,528,630 A | 7/1985 | Sargent | |
| 4,534,288 A | 8/1985 | Brovman | |
| 4,546,700 A | 10/1985 | Kishner et al. | |
| 4,736,680 A | 4/1988 | Wales et al. | |
| 4,764,453 A | 8/1988 | Koboshi et al. | |
| 4,857,745 A | 8/1989 | Gough | |
| 4,857,747 A | 8/1989 | Bolton et al. | |
| 4,887,530 A | 12/1989 | Sainio | |
| 4,932,230 A | 6/1990 | Ishii et al. | |
| 5,018,213 A * | 5/1991 | Sikes | 382/112 |
| 5,053,805 A | 10/1991 | Sakai et al. | |
| 5,076,163 A | 12/1991 | Sainio | |

(Continued)

FOREIGN PATENT DOCUMENTS

DE        1904924 A1    7/1970

(Continued)

OTHER PUBLICATIONS

Wintriss Engineering Corp., Press Releases, News and Events, Wintriss Engineering Corp. website, printed from website May 27, 2004, pp. 1-3, www.weco.com/news.html—Wintress Engineering Corporation, The Surface Inspection Company, San Diego, California, USA.

(Continued)

*Primary Examiner*—Jerome Grant
*Assistant Examiner*—Houshang Safaipour
(74) *Attorney, Agent, or Firm*—Michael Best & Friedrich LLP

(57) ABSTRACT

A camera assembly for use in scanning a paper substrate of a printing press including a housing, a camera mounted within the housing, a light source, and at least one mirror.

17 Claims, 12 Drawing Sheets

U.S. PATENT DOCUMENTS

| | | | |
|---|---|---|---|
| 5,121,137 A * | 6/1992 | Taki et al. ............... | 347/232 |
| 5,125,037 A | 6/1992 | Lehtonen et al. | |
| 5,138,667 A | 8/1992 | Roch et al. | |
| 5,181,257 A | 1/1993 | Steiner et al. | |
| 5,215,011 A | 6/1993 | Monney | |
| 5,227,815 A | 7/1993 | Dastin et al. | |
| 5,305,392 A | 4/1994 | Longest, Jr. et al. | |
| 5,313,886 A | 5/1994 | Muller | |
| 5,321,434 A | 6/1994 | Strauch et al. | |
| 5,329,466 A | 7/1994 | Monney | |
| 5,331,338 A | 7/1994 | Mager | |
| 5,337,668 A | 8/1994 | Matsuoka et al. | |
| 5,365,074 A | 11/1994 | Genovese | |
| 5,388,517 A | 2/1995 | Levien | |
| 5,394,175 A | 2/1995 | Powers | |
| 5,394,222 A | 2/1995 | Genovese | |
| 5,412,577 A | 5/1995 | Sainio et al. | |
| RE35,067 E | 10/1995 | Bauknecht | |
| 5,572,433 A | 11/1996 | Falconer et al. | |
| 5,629,514 A * | 5/1997 | Lee et al. ............... | 250/201.5 |
| 5,646,716 A * | 7/1997 | Nagashima ............... | 355/67 |
| 5,689,425 A | 11/1997 | Sainio et al. | |
| 5,695,106 A | 12/1997 | Bauknecht | |
| 5,713,288 A | 2/1998 | Frazzitta | |
| 5,724,259 A * | 3/1998 | Seymour et al. ........... | 382/199 |
| 5,745,217 A | 4/1998 | Factor | |
| 5,748,780 A | 5/1998 | Stolfo | |
| 5,771,811 A | 6/1998 | Siler et al. | |
| 5,774,226 A | 6/1998 | Muller | |
| 5,797,060 A | 8/1998 | Thompson | |
| 5,812,705 A | 9/1998 | Wang et al. | |
| 5,813,333 A | 9/1998 | Ohno | |
| 5,816,151 A | 10/1998 | Wang et al. | |
| 5,828,793 A | 10/1998 | Mann | |
| 5,917,556 A | 6/1999 | Katayama | |
| 5,930,567 A | 7/1999 | Agano | |
| 5,982,932 A | 11/1999 | Prokoski | |
| 5,992,318 A | 11/1999 | DiBello et al. | |
| 6,005,985 A | 12/1999 | Brison et al. | |
| 6,009,808 A | 1/2000 | Loffler | |
| 6,024,018 A | 2/2000 | Darel et al. | |
| 6,058,201 A | 5/2000 | Sikes et al. | |
| 6,058,839 A | 5/2000 | Frazzitta | |
| 6,075,901 A | 6/2000 | Signes et al. | |
| 6,084,631 A | 7/2000 | Tonkin et al. | |
| 6,085,658 A | 7/2000 | Goldstein | |
| 6,108,436 A * | 8/2000 | Jansen et al. ............... | 382/112 |
| 6,112,658 A | 9/2000 | Gunther et al. | |
| 6,113,260 A | 9/2000 | Genrich et al. | |
| 6,123,261 A | 9/2000 | Roustaei | |
| 6,129,015 A | 10/2000 | Dewey | |
| 6,141,434 A | 10/2000 | Christian et al. | |
| 6,148,313 A | 11/2000 | Freidin et al. | |
| 6,157,744 A | 12/2000 | Nagasaka et al. | |
| 6,219,516 B1 | 4/2001 | Furst et al. | |
| 6,242,944 B1 * | 6/2001 | Benedetti et al. ........... | 326/39 |
| 6,295,115 B1 | 9/2001 | Zhang et al. | |
| 6,407,800 B1 * | 6/2002 | Shimokawa et al. ........ | 355/55 |
| 6,422,142 B2 | 7/2002 | Steinbacher | |
| 6,456,733 B1 * | 9/2002 | Miyauchi et al. ........... | 382/112 |
| 6,661,446 B2 * | 12/2003 | Beier et al. ............... | 347/241 |
| 6,750,466 B2 | 6/2004 | Guha et al. | |
| 2001/0017838 A1 * | 8/2001 | Hatano et al. ............ | 369/112.24 |
| 2002/0141003 A1 | 10/2002 | Chang et al. | |

FOREIGN PATENT DOCUMENTS

| | | | |
|---|---|---|---|
| EP | 0598490 | | 5/1994 |
| JP | 11-97343 | * | 4/1999 |

OTHER PUBLICATIONS

Wintress Engineering Corp., News Release- Mar. 20, 2000, Wintriss Engineering Corp. website, printed from website May 27, 2004, pp. 1-2, www.weco.com/news/03-20-00.html—Wintress Engineering Corporation, The Surface Inspection Company, San Diego, California, USA.

Wintress Engineering Corp., News Release- Wintress Engineering's New Web Ranger 2000 Inspection System for Low Contrast Defects Finds Flaws of Just 0.005" and Smaller, Wintriss Engineering Corp. website, printed from website May 27, 2004, pp. 1-2, www.weco.com/news/06-09-00.html—Wintress Engineering Corporation, The Surface Inspection Company, San Diego, California, USA.

* cited by examiner

1

CAMERA ASSEMBLY FOR A PRINTING PRESS

FIELD OF THE INVENTION

The present invention relates to a control system for a printing press, more particularly to a camera assembly for acquiring images of the paper substrate moving on the printing press, and more particularly to color registration control on a printing press.

BACKGROUND OF THE INVENTION

In web offset printing presses, a substrate such as a web of paper is sequentially driven through a series of print cylinders, each using ink of a different color, which cooperate to imprint a multicolor image on the web. To provide an accurate and clear multicolor image, the rotational and lateral position of each print cylinder must be precisely aligned, i.e., proper color registration of the respective colors must be maintained.

Color registration control systems for printing presses are known in the art. An example of a closed-loop color registration control system is the commercially available RGS V From QTI of Sussex, Wis. The RGS V system provides a closed-loop color registration control system employing an optical line scanner which cooperates with paper movement to provide, in effect, a two-dimensional raster scan of a predetermined portion of the web on which registration marks are imprinted by the respective print cylinders.

In general, a color registration control system interacts with a printing press to keep a plurality colors in registration, i.e., lining up the colors on top of each other while the colors are being printed. Most printing presses use three basic subtractive primary colors (yellow, magenta, cyan) and black to create a printed image. Special print colors can also be utilized. There are several reasons why the print may not be in register. For instance, the printing plates may not be mounted or setup on the plate cylinder correctly. Dynamics such as tension, stretch, ink coverage, and web weave can in turn introduce a color register error between different printing units.

Typically, color registration control systems includes a scanning unit for acquiring images of the substrate being printed upon, a processing unit for searching for color register marks and image processing the acquired images, a conventional shaft encoder and a suitable motor controller. The registration control system generates control signals to an adjustment mechanism in accordance with the relative positions of the registration marks. The system then provides appropriate signals to the electric motors to precisely control lateral and rotational position of the various plate cylinders.

However, the processing unit and the scanning unit are generally housed in different devices in different locations on or near the printing press. For example, the scanning unit is often mounted above the web and the processing unit is often located in a different location. The devices must therefore be interfaced by running video cables between them. It is normally difficult to transmit an image from the scanning unit to the processing unit without distortion, with the distance between the devices further contributing to the degradation of the high quality image processing desired. Further, difficulties exist in transmitting such large amounts of data.

Tracking is another registration control system concern resulting from the remote relative placement of the scanning unit and the processing unit. It can be difficult to setup and install the scanning unit properly on a printing press. Since the alignment of the scanning unit is important and the scanning unit depth-of-field is shallow, readjustment may be required when the scanning units are changed.

Synchronization can also be a challenge. Existing registration control systems typically attempt to synchronize a free-running camera with standard video output (e.g. RS-170) to a strobe and the web-position encoder. Precise synchronization can be difficult because it requires synchronization between a plurality of devices in the control system including proper lighting and the scanning unit.

Specifically, the synchronization becomes difficult because some area scanning units are not re-triggerable. They simply continuously read out frame data. The problem in using these scanning units for any image recognition is that the scanning unit is typically running at a constant 30 Hz that is totally asynchronous to the speed of the printing press. There is no guarantee that the scanning unit is in the right part of the printing cycle when the mark pattern is directly under the lens of the scanning unit. A typical compensation procedure is to keep the ambient lighting detected by the scanning unit relatively dark, and then activate a strobe light based upon the encoder pulse count at a desired time.

Such scanning units work in such a way that they generally have a light sensitive image area and a storage area. The light sensitive area is accumulating charge (exposing/integrating) while the storage area is being read out. In other words, a current frame is always being exposed while a previous frame is being read. There is a lag time in between frames when the charge of the current frame is being transferred from the imaging area into the storage area. If the strobe activates during this part of the cycle, the image contains total darkness if the strobe duration is entirely within a time between frames, or it contains some amount of partial darkness if the strobe duration partially overlaps the time between frames and partially overlaps the frame time. Neither of these is desirable because it is difficult to identify if the dark image is caused by the synchronization problem or if it is an indication that the light source is too dark and hence requires adjustment. Synchronization is based upon an interaction between the printing press speed and the frequency at which the color register marks are showing up under the lens of the scanning unit with the frequency of the scanner itself. At certain press speeds, a high percentage of images would be partially dark just due to the interaction of these two frequencies.

To overcome the discrepancy between the two frequencies, re-triggerable scanning units can be considered. This involves interrupting the frame/field that is being read, and restarting the sequence based upon a pulse re-triggering rate. However, the re-triggering rate is often measured in large multiples of microseconds or even milliseconds, and often re-triggering is coupled with clearing the sensor charge in preparation for a fresh exposure. These steps take time and result in the printed register marks moving a long distance in this period of time at high press speed. A solution is to provide an anticipator circuit that re-triggers the scanning unit at a number of encoder pulses before the actual encoder pulse at which the picture is to be taken. When the actual encoder count occurs, a strobe trigger is activated. However, the number of pulses required in the anticipation is dependent on the press speed, and this complicates the system design, its implementation and flexibility.

In typical color registration control systems, each printing unit of a printing press prints at least one registration mark of a predetermined size and shape on a predetermined portion of the web, typically along its edge. When in proper registry, the registration marks from the individual print units will be in predetermined relative disposition or pattern on the web. Some registration control systems adopt a normalized nominal reference coordinate system with a Y axis parallel to the direction of web movement and an X axis parallel to the scan lines. Deviation of marks from such relative dispositions is indicative of a registration error, i.e. misregistration. For example, deviation from an expected X value is indicative of lateral misregistration, and deviation from the expected Y value is indicative of circumferential misregistration.

Color registration marks can have various configurations such as a right angle diamond (i.e. a square rotated by 45 degrees) and various sizes such as 0.04" or 0.06" diamonds. Symmetrically shaped register marks facilitate a determination of a predetermined point associated with the mark, e.g., the center points of the mark.

A lighting source is typically employed to illuminate the web in order for the scanning unit to acquire a useable image of the web. A plurality of high-intensity light sources such as tungsten-halogen bulbs can be used to illuminate the web, and especially the registration marks printed on the web. Many existing color registration systems utilize two light sources or bulbs in at attempt to achieve high-intensity, uniform illumination. In a two bulb system, the light source illumination characteristics have to be matched, and moved away from the lens to provide uniformity of the lighting. The cost of maintaining two light sources is also high.

Once the web has been illuminated, the scanning units are then focused on the illuminated portion of the web. The scanning units generally include optical line or area scanners cooperating with suitable circuitry for controllably driving the scanning unit, such as suitable transfer pulse synchronization logic, conventional CCD driver circuitry, conventional buffer circuitry, and a video analog-to-digital converter.

Color registration control systems are typically designed to provide a closed-loop control that automatically converges to target settings and maintains color registration throughout the entire print run. Some color registration control systems may either need to be told where to find the register marks, have limited searching capability, and/or require many plate revolutions to find the register marks. Accordingly, make-ready time can be lengthy which results in waste of material and time.

SUMMARY OF THE INVENTION

The present invention provides an improved color registration control system and method. The system includes a search method and system to search the paper substrate of a printing press laterally and circumferentially to decrease the time it takes to find the register mark pattern. The search method and system is able to provide a complete circumferential search for the register marks including searching and image processing every 30 milliseconds and utilizes small register marks on the order of 0.010" for example.

The present invention also provides an improved scanning unit or camera assembly which is easy to setup and less sensitive to alignment. The camera assembly has a small footprint or profile and includes within a housing a scanner on a sensor board, a light source, an optics system, a main board including a microprocessor and hardware-based image processing implemented on FPGAs. The light source includes a single bulb type light source that provides dual light paths of uniform illumination using mirrors. The mirrors enable uniform illumination with a single bulb source and enable the camera assembly outer dimension to be narrow making it easier to mount on a printing press especially at the extremities of the web.

Synchronization between the light source, scanner and web-position encoder on the printing press is provided for. The method of synchronization eliminates the standard video timing, and instead creates image acquisition-on-demand timing.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION OF THE PREFERRED EMBODIMENT

In conjunction with the description of the preferred embodiment, a web offset printing press will be described. It should be noted, however, that the invention can be utilized on printing presses other than web offset presses.

Figure 1:
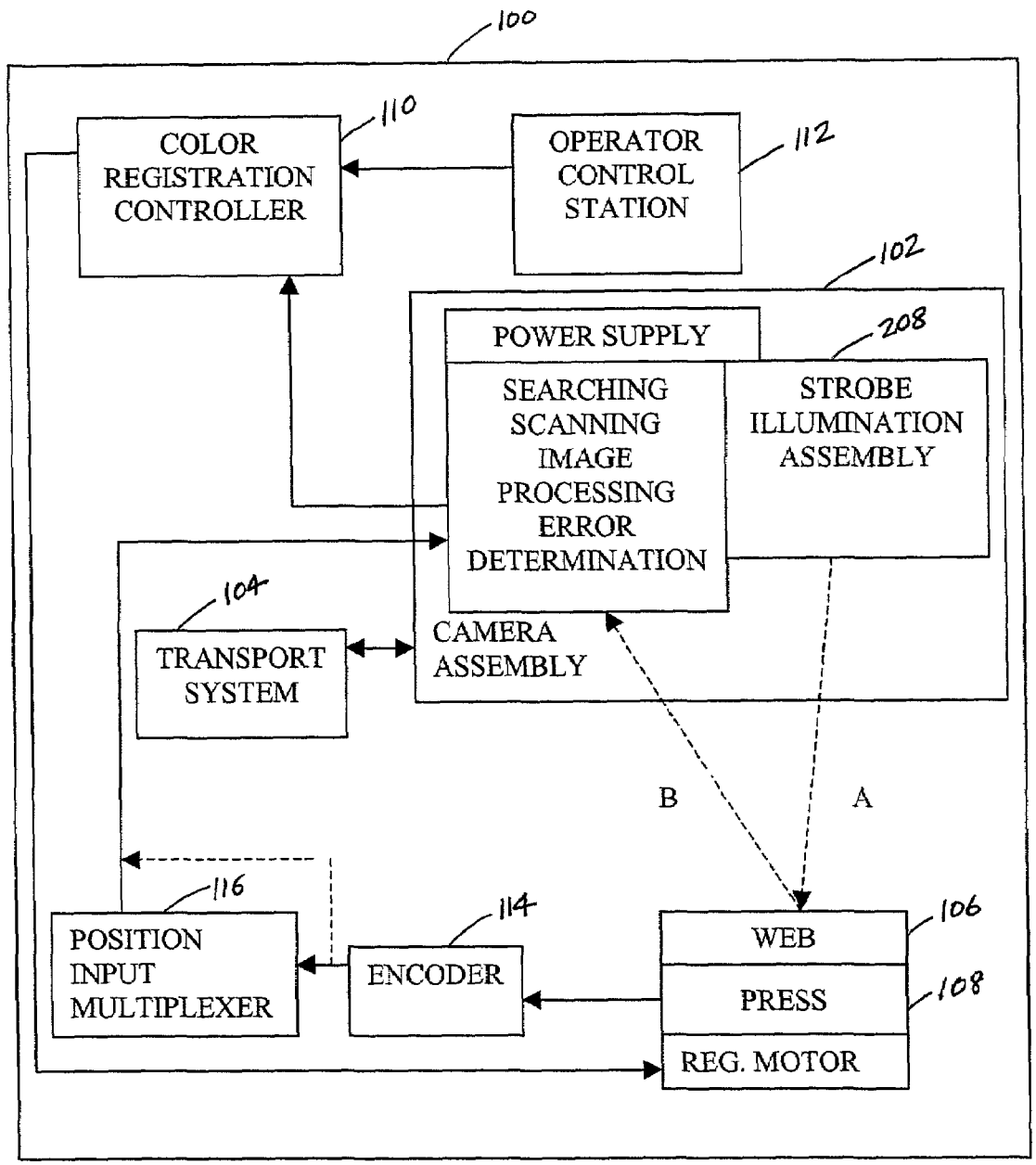
FIG. 1 is a block diagram of a color registration control system of the present invention.

Referring to FIG. 1, a color registration control system 100 is shown and includes a scanning unit or camera assembly 102 and an associated transport system 104. The transport system 104 can be of a manual or automated design. Preferably, an automated design is used such as is known in the art. Generally, an automated transport system can include a linear actuator and a motor with a motor controller. The actuator consists of a bar, carriage, coupling mechanism, transport mechanism (e.g. screw or belt), and position encoder. Optionally, the transport system 104 may also include limit switches, jog buttons (to allow the operator to move the carriage), and indicators such as the direction it is moving and whether or not the camera assembly 102 is tracking the register marks. However, it should be noted that other suitable transport mechanisms can also be employed to provide mobility to the camera assembly 102.

The camera assembly 102 takes an acquisition-on-demand image of a web 106 of a printing press 108 and processes the image within the camera assembly 102. The camera assembly 102 will be described hereafter in operation in conjunction with a color registration control system 100 and color registration controller 110 of a web offset printing press. However, it should be noted that the camera assembly 102 can be utilized on other types of printing presses and in other printing press control systems wherein an image of the moving web is needed such as in ink density color control, cutoff control, ribbon or sidelay control, fanout and cocking control, and web inspection.

Figure 2:
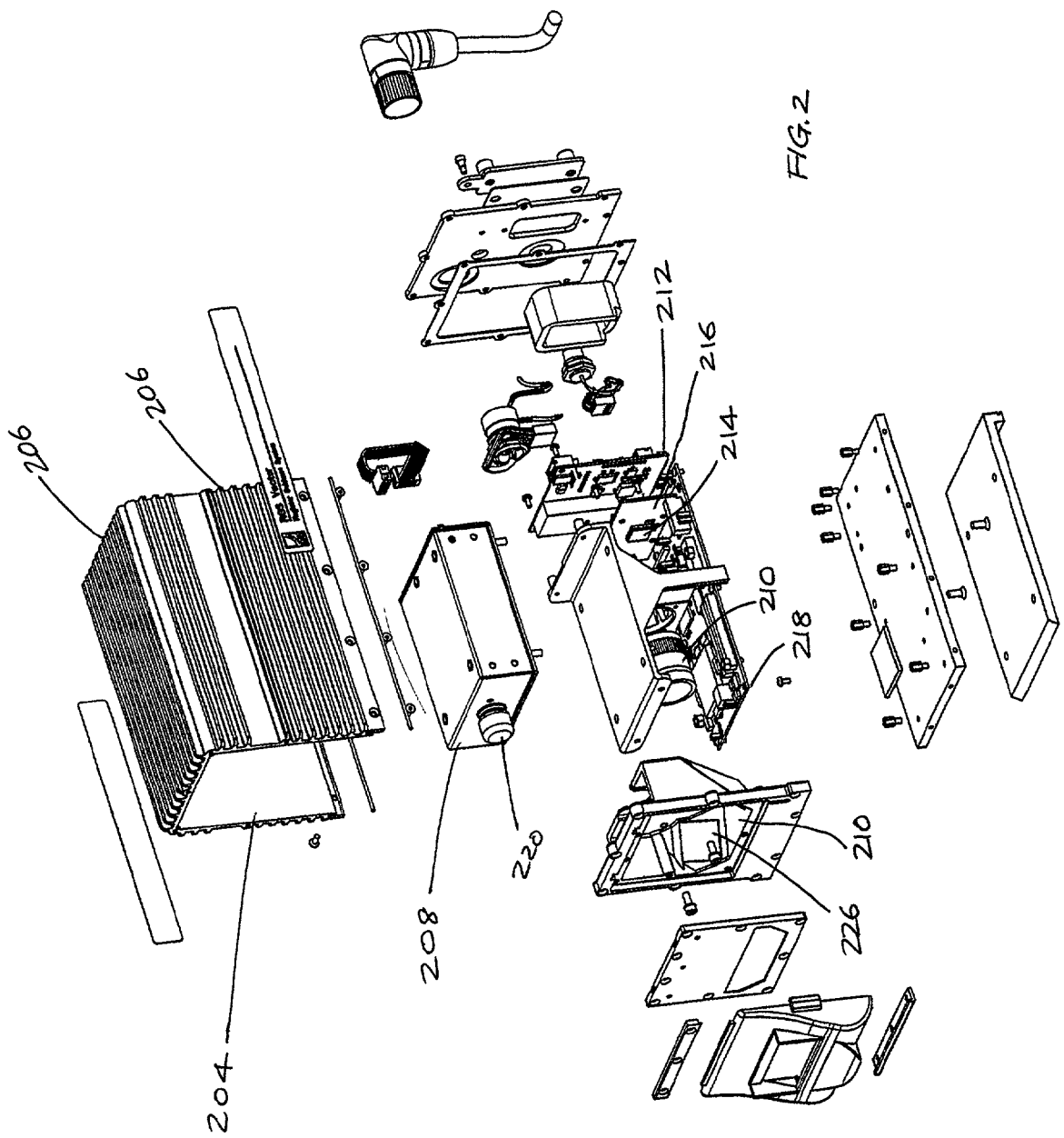
FIG. 2 is an exploded perspective view of a camera assembly.

Referring now to FIG. 2, the camera assembly 102 is shown in detail. The camera assembly 102 includes an outer housing or case 204. Ribs 206 on the housing are utilized to dissipate heat. The camera assembly 102 defines a self-contained package for processing images of the web in a small footprint, in contrast to the scanning function being in one location and the processing in another remote location with a video cable connection therebetween. By including the scanning and processing components all within a single housing or package, the difficulty of transmitting the image data is eliminated and distortion and degradation problems of the image data are significantly reduced. Preferably, the housing has width dimension of 4" or smaller.

The components contained within the housing 204 of the camera assembly include a light source 208, an optics assembly 210, a power supply and interface board 212, an image sensor 214 on a sensor board 216, and a main board 218.

With respect to the light source 208, preferably the light source is a single source and more preferably a strobe light source. A strobe light source freezes the motion of the moving web by firing with a short duration. It should be noted, however, that other light sources such as a strobed set of LEDs could also be employed.

Figure 9:
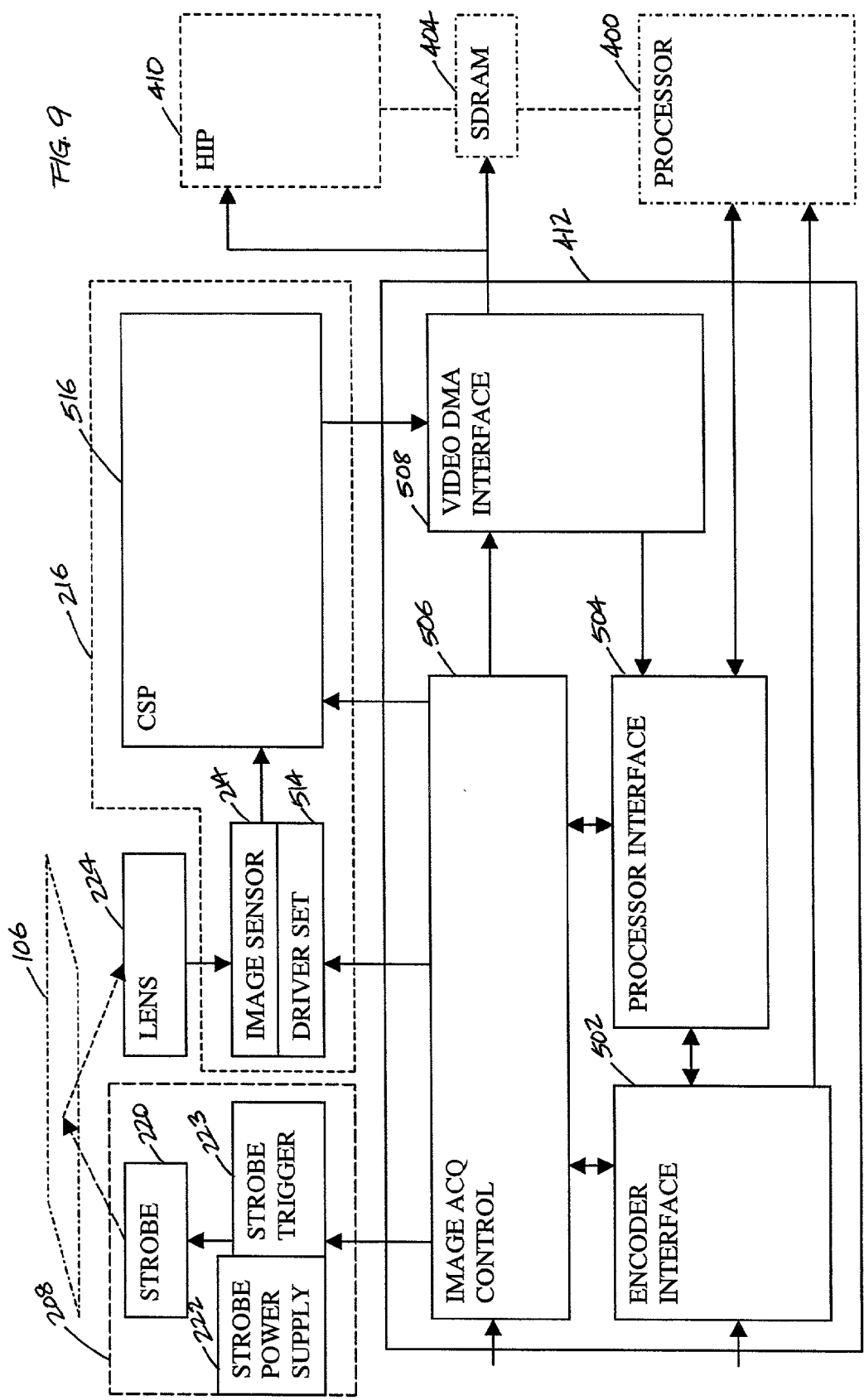
FIG. 9 is a block diagram of a VHS FPGA module and part of a sensor board.

In the preferred embodiment, a strobe illumination assembly 208 is utilized. The assembly 208 includes a strobe bulb 220, such as a Xenon strobe bulb, a high voltage power supply 222, and a strobe trigger 223 (FIG. 9). When the strobe bulb 220 is fired, the energy in a capacitor is controllable and is transferred into the bulb 220. The strobe power supply 222 used in the preferred embodiment has a low-voltage trim input that is used to set the capacitor voltage. The low-voltage trim input is further controlled with a D/A converter.

With respect to the optics assembly 210, preferably the assembly 210 includes a lens 224 and a mirror assembly 226. The lens 224 is for example a F7 adjustable focus lens having a focal length of approximately 21 mm.

Figure 4:
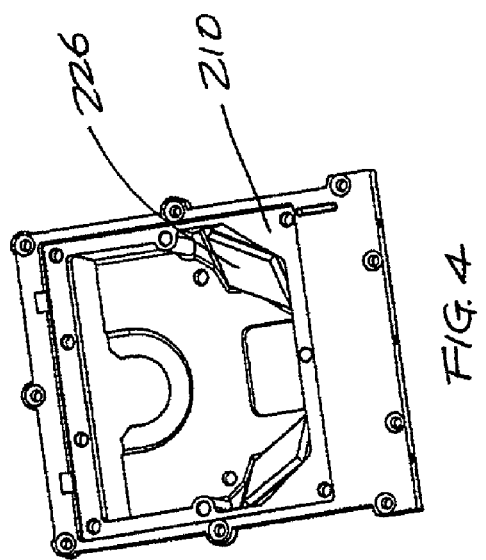
FIG. 4 is a front view of the mirror assembly.
Figure 3:
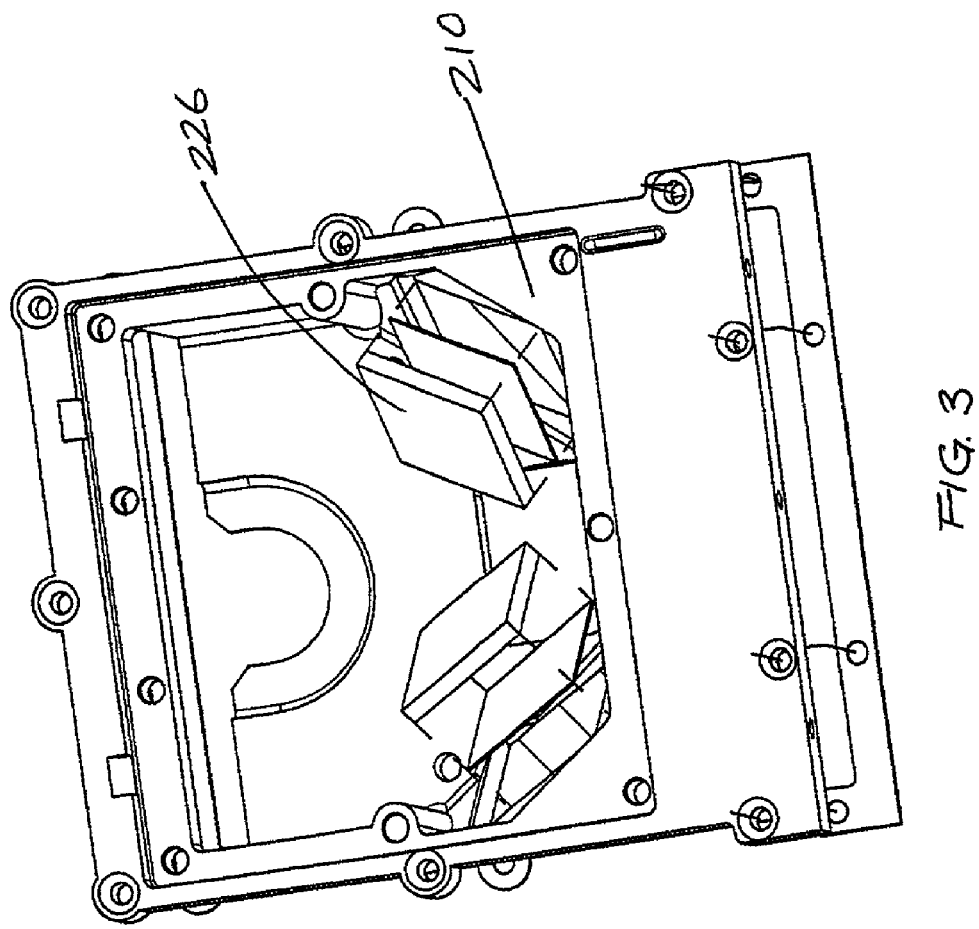
FIG. 3 is a front view of a mirror assembly.

As best shown in FIGS. 3 and 4, the mirror assembly 226 includes two flat mirrors 228, 230 positioned as shown. It should be noted that the mirrors 228, 230 could have other configurations other than flat such as, for example, concave mirrors. The mirrors are front silvered to eliminate the problem of ghost images and are attached to a mounting housing with an adhesive such as glue or preferably a double-sided adhesive tape. The mounting housing includes stops to aid in the location of the mirrors upon assembly.

Figure 5A:
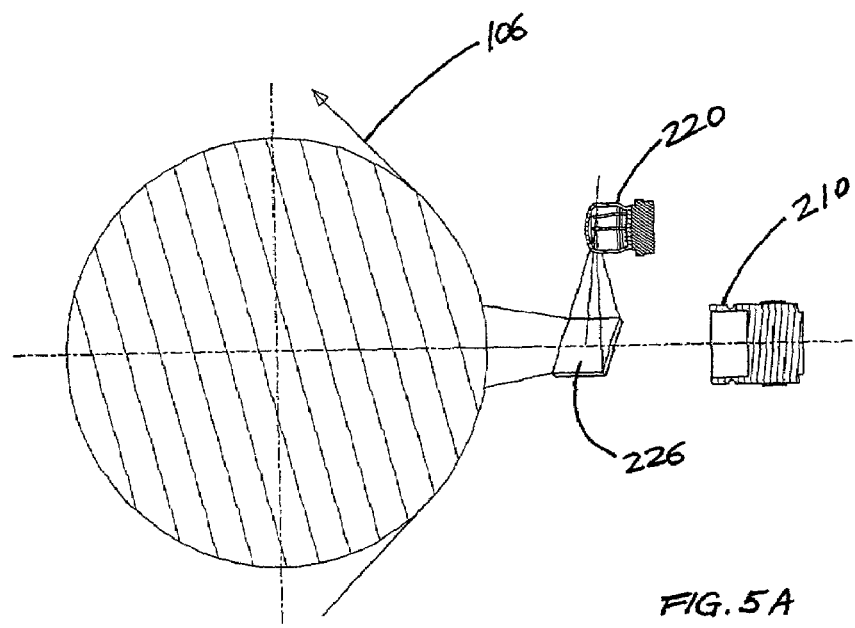
FIG. 5A is a schematic sectional view of a light path structure.
Figure 5B:
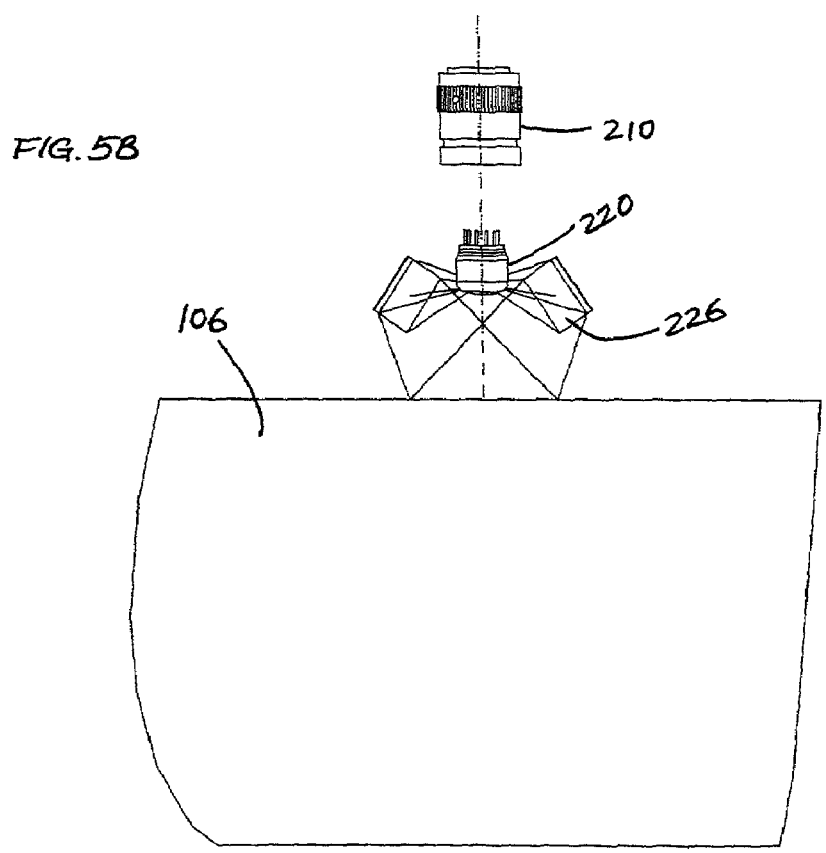
FIG. 5B is a schematic top view of a light path structure.

As best shown in FIGS. 5A and 5B, the mirrors redirect light from the strobe bulb 220 located in-between and, preferably, above the mirrors so that the light is in the same plane as the imaging axis (lens axis), that plane being normal to the curved surface of the idler and intersecting the rotational axis of the idler. The mirrors are spaced far enough apart so that no specularly reflected incident light ray will enter the lens 224 and cause glare. The lens 224 is symmetrical about a vertical plane that is orthogonal to the plane in which the incident light and lens axis occur, the intersection of these two planes being a line that is coincident with the lens axis. This symmetry provides uniformity of illumination from each mirror 228, 230

As such, the mirrors 228, 230 are designed to receive light from the single light source and create dual light paths of substantially uniform illumination directed toward the web 106 of the printing press 108 as is shown FIGS. 5A and 5B. With the use of a single light source, light source illumination characteristics do not have to be matched to approximate uniform illumination. Further, the cost of supply and replacement of a single light source, as compared to a dual light source implementation, is reduced by half. The mirror assembly 226 enables a dual light path to be created with each path being at substantially the same illumination level. The single source/mirror combination also enables the housing 204 of the camera assembly 102 to be of a reduced width dimension enabling the camera assembly 102 to be positioned in locations not otherwise accessible, such as at the web extremities. The smaller profile camera assembly 102 can be positioned at the extremity of the web 106 and not be interfered with by the sideframe of the printing press 108.

Referring now to the power supply and interface board 212 within the housing 204 of the camera assembly 102, it includes a conventional low voltage power supply and conventional communication interfaces.

With respect to the image sensor 214, preferably a CCD area scanner is utilized such as an image sensing device available from Texas Instruments as model TI TC237B. It would be apparent to those of ordinary skill in the art that other devices such as a CMOS image sensor may also be used. The sensor board 216 includes drivers, the image sensor 214 and a CCD signal processor (CSP) 516 as shown in FIG. 9 as will be described hereafter.

In general operation and with reference back to FIG. 1, the camera assembly 102 functions as follows. Upon receipt of an activation signal, the strobe illumination assembly 208 is activated and illuminates the web 106 as shown by arrow A. The reflected light off the web 106, as shown by arrow B, is received by the image sensor 214 and the resulting image data is processed within the camera assembly 102. After processing, if it is determined that the camera assembly 102 should be positioned in a different location, such as when searching for color register marks, a move request and a web position are sent to the transport system 104. The transport system 104 then re-positions the camera assembly 102 either manually or automatically. For example, if automated, the transport system 104 allows an automatic, controlled side-to-side movement. If, however, the transport system 104 is to be operated manually, a status indicator can be activated to indicate to an operator a direction in which to move the camera assembly 102.

The register error, even if zero, will be reported to the color registration controller 110. An operator can then access the register error and other information such as the system configuration and setup, troubleshoot, or track system operation through an operator control station 112.

Figure 6:
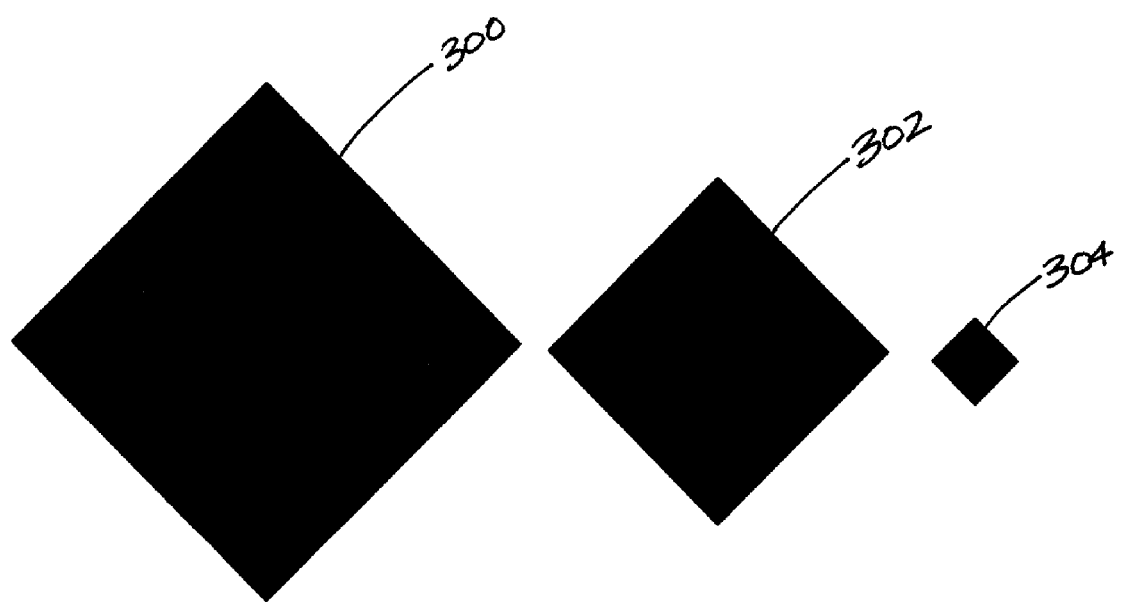
FIG. 6 is a schematic view of color registration marks.

Referring now to FIG. 6, typical predefined color register marks 300, 302 and 304 are shown in a 50:1 scale. The mark 304 is preferably used with the present invention and is 0.010" to scale. However, it should be noted that other predefined and programmable register marks can be used as will be explained in detail hereafter.

Figure 7:
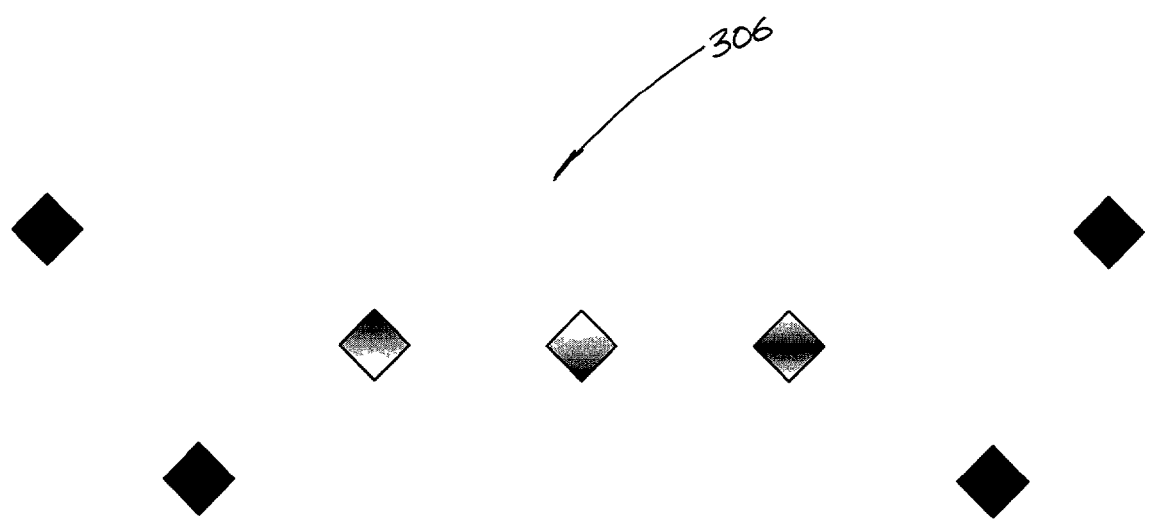
FIG. 7 is a schematic view of a color registration mark pattern.

FIG. 7 illustrates an exemplary predefined register mark pattern 306. Specifically, in order to control color register, the control system 100 needs to measure the position of the printed color register marks relative to each other, and to correct for any erroneous positions. To measure the positions of color register marks, a plurality of register marks in a register mark pattern 306 are printed on the web 106 such as the exemplary pattern 306 shown in FIG. 7. The pattern 306 includes four marks of one ink color and one mark of each of the other three ink colors, however, other patterns can also be utilized.

Ideally, if the printed color register marks match the predefined pattern 306, color is in register. The camera assembly 102 locates and measures the relationship of the printed marks of each color relative to each other and relative to the predefined pattern 306. The difference between the locations measured by the camera assembly 102 and the predefined pattern 306 is considered a register error. The procedure then includes sampling the printed marks at a mark sampling rate, e.g. five shots per second, filtering the resulting register error samples, and feeding the register error samples to a control algorithm. The control algorithm then decides how to correct the error. The printing press 108 includes a plurality of register motors that allow small lateral and circumferential adjustments of the printing cylinder relative to the rest of the printing press. The color registration controller 110 performs the error adjustments as is known in the art.

Even if the printed mark pattern perfectly matches the predefined format 306, there still might be a residual error. Residual error is often generated as a result of plate mounting errors or plate errors introduced in the manufacturing process. An operator measures that error manually and enters an offset into the controller 110 to compensate for the error. Thereafter, the controller 110 is enabled to control the corrected (offset) pattern.

Figure 8:
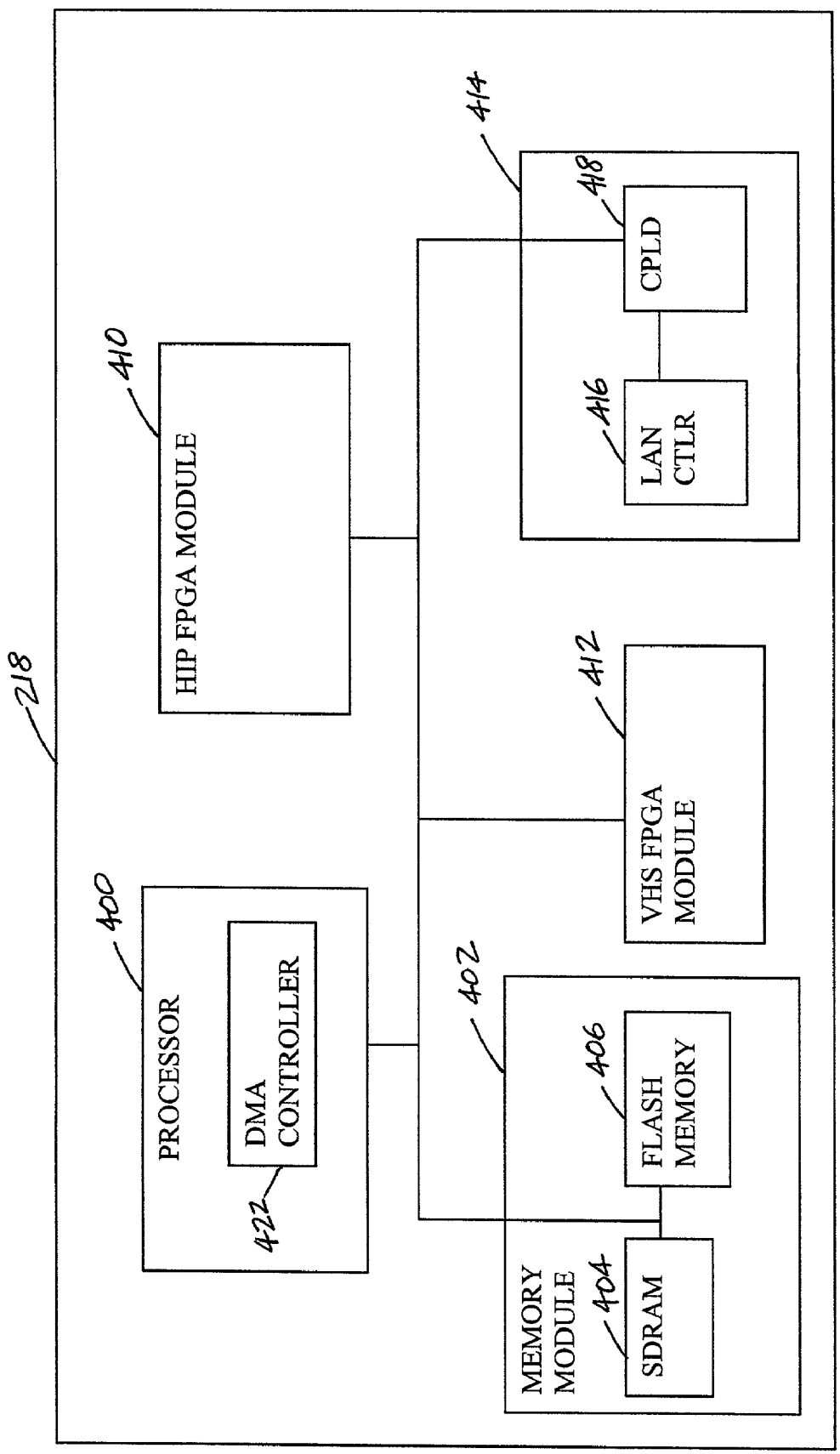
FIG. 8 is a block diagram of a main circuit board of the camera assembly.

Turning now to FIG. 8, the main circuit board 218 of the camera assembly 102 is shown schematically. The main board 218 includes a processor 400, preferably an embedded microprocessor such as the 32-bit Motorola ColdFire MCF5307, and a memory module 402 for data and instruction storage. The memory module 402 is operatively coupled to the processor 400 and it further includes a SDRAM module 404 such as two Micron Manufacturing MT48LC4M16ATG-75 SDRAMs, and a field-re-programmable nonvolatile storage/flash memory module 406 such as an Intel TE28F160C3BA90 flash memory. The SDRAM module 404 provides, in general, run-time storage of all software instructions and data, whereas the flash memory module 406 stores an operating system, a plurality of FPGA bit files, a plurality of configuration parameters, a plurality of diagnostic logs and application executables. It would be apparent to those of ordinary skill in the art that other memory devices such as a DRAM, a DDR SDRAM (double data rate SDRAM), a Rambus DRAM, a high speed SRAM, or the like may also be used.

The processor 400 is also operatively coupled to a hardware image processing (HIP) FPGA module 410 such as a Xilinx XCV100E FPGA, and a video head subsystem (VHS) FPGA module 412 such as a Xilinx XCS30XL FPGA which interfaces between the processor 400 and the sensor board 216. It would be apparent to those of ordinary skill in the art that other devices such as an ASIC, a CPLD, a PLD, a dedicated image processing hardware offered by Sumitomo Metals, a processor with FPGA or CPLD structure built in, or the like may be used in instead of the FPGAs. The processor 400 includes a DMA controller 422 as will be explained in more detail below.

The main board 218 also includes a LAN interface module 414. The LAN interface module 414 includes an Ethernet LAN controller 416 such as a Crystal/Cirrus CS8900A ISA bus Ethernet LAN controller (which provides 10BaseT connectivity for the camera assembly) and a LAN controller interface (CPLD) 418 such as a Xilinx XC95144XL-10TQ144I.

Turning now to FIG. 9, the VHS FPGA module 412 and the main components of the sensor board 216 are illustrated. The VHS FPGA module 412 includes a plurality of controls and interfaces, such as an encoder interface 502, a processor interface 504, an image acquisition control 506, and a video DMA interface 508. The VHS FPGA module 412 generates all of the signals that the sensor board 216 needs in order to operate.

The VHS FPGA module 412 also functions to interface to an optical rotary encoder 114 (FIG. 1) on the printing press 108 and take an image of the web 106 at a specified location. Specifically, the encoder 114 is operatively coupled to the printing press as is known in the art. The encoder 114 provides an indication of the circumferential position of a printing plate and provides high resolution rotational position information directly to or via a position input multiplexer 116 (FIG. 1) to the camera assembly 102. Images of the web 106 are then taken at different circumferential positions by choosing different encoder pulse counts at which the images are taken.

Based on demand, the processor 400 initiates an image acquisition process, and specifies an encoder pulse count at which an image of the web 106 is taken that corresponds to the desired image. The encoder interface 502 then generates a trigger signal at the encoder pulse count specified by the processor 400. The encoder interface 502 then signals the image acquisition control 506 to activate the strobe illumination assembly 208. When the web 106 is illuminated, the reflected light from the web 106 is detected by the lens 224 and the image sensor 214. In the preferred embodiment, the image sensor 214 is driven by a driver circuit 514 with drivers such as Elantec EL7202 high speed dual channel power MOSFET drivers. The image sensor 214, located on the sensor board 216 and controlled by the image acquisition control 506, retains the image in analog form and provides the image as a serial stream of pixels to a CCD signal processor (CSP) 516 or an image digitizer such as a EXAR XR98L55, also located on the sensor board 216. The CSP 516 subsequently converts each pixel to a 8-bit digital output at a 12.5 MHz rate.

Particularly, the VHS FPGA module 412 buffers up the image data (typically a stream of 8-bit pixels) coming back from the sensor board 216 in the video DMA interface 508. When the DMA interface 508 has 16 bytes, it issues a DMA request to the processor 400. The DMA controller 422 of the processor 400 services the DMA request and conducts a burst read of the image data off the VHS FPGA module 412 followed by a burst write to the SDRAM 404, in either a single address access mode or a dual address access mode, where the single address mode is preferred. The VHS FPGA module 412 keeps requesting DMA transfers until eventually a full image has been read out and transferred into the SDRAM 404 via the video DMA interface 508.

To solve the problems of synchronization, the VHS FPGA module 412 takes direct control of the scanning function by providing an image acquisition-on-demand ability while keeping the image sensor 214 relatively free of charge. If the scanner is allowed to remain idle without being read out, the image sensor 214 would slowly integrate the ambient light and dark current until becoming saturated.

In the preferred embodiment, the VHS FPGA module 412 includes the auto-clearing mode referring to the period when the VHS FPGA module 412 is waiting to be notified to take an image. Depending upon the specific image sensor 214 used, pulses should be provided to keep the image areas and storage area clear. Depending upon the type of CSP 516 used, a steady stream of dark pixels should be provided to maintain a plurality of biases.

The auto-clearing mode can be interrupted at any time when an image needs to be taken. When a signal is received to take an image, the auto-clearing mode is stopped, and an integration mode/period is entered. After the integration period is entered, the strobe trigger 223 and the strobe bulb 220 are activated. After the integration period, the VHS FPGA module 412 transfers the frame image data from the image area to its storage area, and the data is read out one line at a time.

The VHS FPGA module 412 also provides the high-speed DMA interface 508 to the processor 400 with the processor 400 including the DMA controller 422 with a plurality of channels. The DMA channels are run in a cycle-stealing mode in which each DMA request executes a single transfer of data, e.g. 16 bytes. In traditional non-cycle-stealing-DMA, the DMA controller 422 is programmed with a source address, a destination address, a count of the bytes in the overall transfer, and a size of each cycle in the transfer. When a DMA transfer occurs, the DMA controller 422 executes as many cycles as it needs to contiguously complete the entire transfer. When the DMA executes the entire transfer at once, a buffer as large as the entire image is required until the image is completely read out of the image sensor 214, and buffers of such size can increase cost of the system. Cycle-stealing DMA, in contrast, executes only a single cycle of sixteen bytes every time a DMA request is serviced. The VHS FPGA module 412 buffers only 16 bytes before it asserts the DMA request and then the DMA controller 422 steals a bus cycle in order to perform the transfer of data.

Saving a full image before executing the DMA transfer would require an external RAM. Instead, the preferred embodiment uses a small first-in-first-out (FIFO) module that can store enough bytes in order to buffer the bytes that are acquired while waiting for the DMA controller 422 to respond to a previous request.

In one embodiment as an example, the VHS FPGA module 412 reads pixels out of the image sensor 214 at 12.5 MHz, approximately one pixel every 80 ns, and therefore, sixteen pixels are ready every 1280 ns. Executing the DMA cycle takes about 7 bus clocks meaning that the VHS FPGA module 412 will need about 7 bus clocks×22 ns=154 ns of the bus every 1280 ns which is about 12% of the processor bus bandwidth.

In the preferred embodiment, and because the VHS FPGA module 412 is basically re-programmable, the FPGA design can be adapted or changed very easily to match up with different image sensors. For example, if a CMOS image sensor technology is utilized, program changes are necessary at the VHS FPGA module 412 in order that it is able to interface to the CMOS devices without changing the main board 218 layout.

Figure 10:
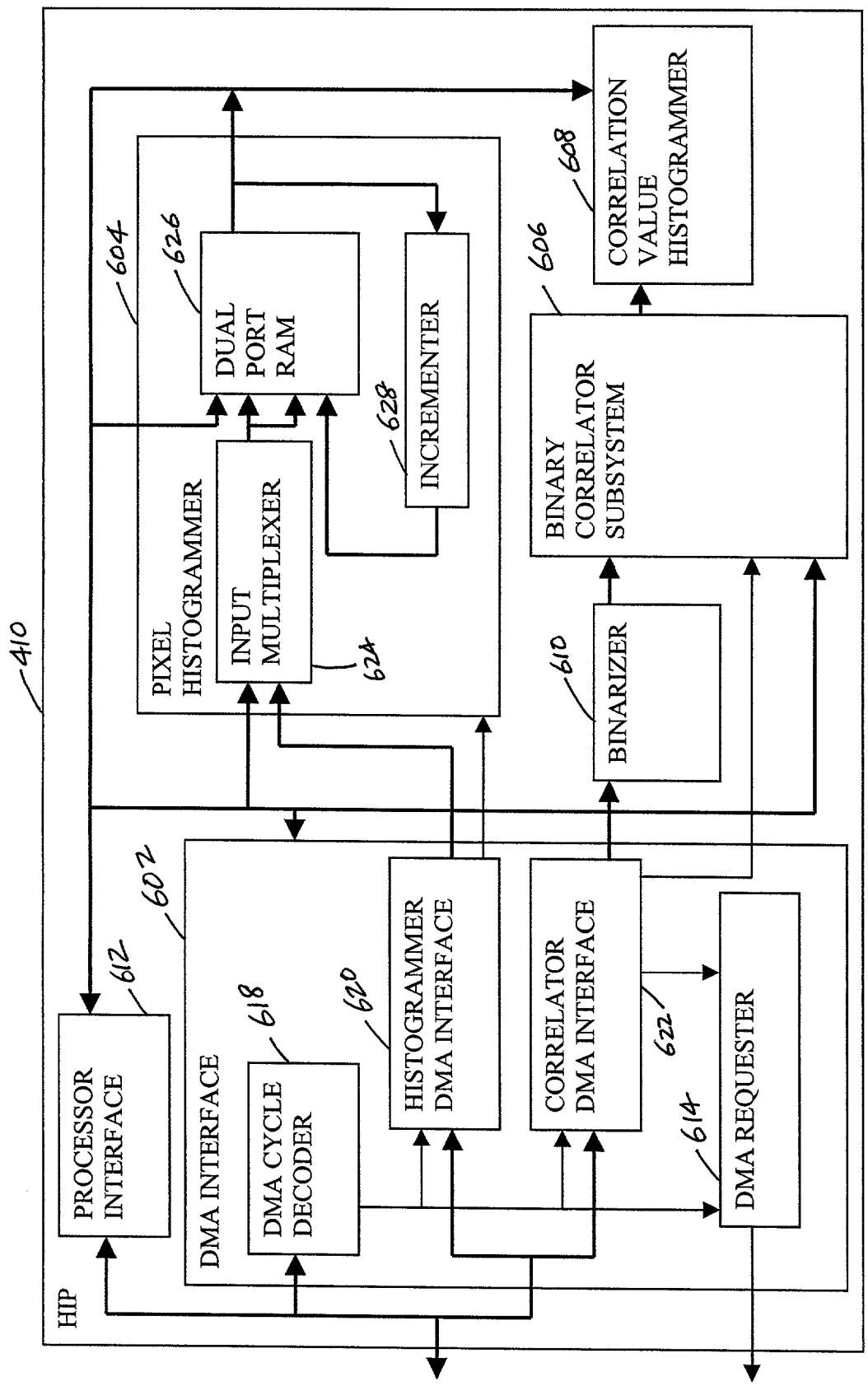
FIG. 10 is a block diagram of a HIP FPGA module.

Referring now to FIG. 10, the HIP FPGA module 410 is shown and includes a DMA interface 602, a pixel histogrammer 604, a binary correlator 606, a correlation value histogrammer 608, a binarizer 610, a processor interface 612, and a DMA request arbiter 614. The DMA interface 602 is responsible for getting data from the bus. DMA data is transferred via high-speed cycle-stealing burst transfers. Details of the DMA interface 602 are discussed hereinafter.

The pixel histogrammer 604 runs on the VHS DMA channel and calculates a gray scale histogram each time that the VHS FPGA module 412 transfers an image into SDRAM 404. The gray scale histogram is used to set the binarization level or the initial conditions of the binarizer 610, which binarizes the image pixel value to 0 or 1. The binary correlator 606 includes a correlator and all the logic used to run it and store its results. It can be run on the VHS DMA channel or its own DMA channel, depending upon how it is programmed. The correlation value histogrammer 608 creates a histogram of the correlation values when the binary correlator 606 is run. The correlation value histogrammer 608 is also used in the event that the correlator 606 produces no or few results, or if the correlator 606 results overflow. It can then be used to calculate an appropriate correlation threshold that could be used on a recorrelation to get a satisfactory number of correlation results.

The processor interface 612 is preferably responsible for decoding the processor read, write, and interrupt acknowledge bus cycles, and for recognizing and handling an overall timing of these cycles. Part of the address decoding of write cycles occurs within the processor interface 612. Additional decoding is also performed, where appropriate, within other blocks in the HIP FPGA module 410, and when the other block has more than one register or a RAM with more than one address location.

Specifically, the DMA interface 602 further includes a DMA cycle decoder 618, a histogrammer DMA interface 620, and a correlator DMA interface 622. In an alternative embodiment, the interfaces are DMA channel-centric instead of image processing tool-centric. This would approach the histogrammer DMA interface 620 and the correlator DMA interface 622 with both the first DMA channel interface and a DMA second channel interface. The main goal of the DMA cycle decoder 618 is to look at input signals that indicate whether a DMA cycle is occurring and then generate output signals that bracket when the SDRAM data is valid on the internal data bus so that it can be saved into FIFOs in the histogrammer and the correlator DMA interfaces 620, 622 respectively. The interface 602 also generates an additional signal for the correlator DMA interface 622 to indicate the end of a DMA transfer intended for the correlator.

Common features of the histogrammer and correlator DMA interfaces 620, 622 are a DMA FIFO with status indication, a FIFO read control state machine, and a means to convert from a 4 pixel wide data stream to a 1 pixel wide data stream. The DMA FIFO is preferably a 64 bit deep by 32 bit wide (four pixel) FIFO that is operatively coupled to the synchronized internal copy of the processor data bus. The write enable of each DMA FIFO is fed by the DMA cycle decoder data detector 618. When a DMA cycle occurs, the sixteen pixels (4 clocks of 4 pixels each) are saved in the DMA FIFO. The DMA FIFO has status outputs that indicate whether it is empty or full. In this case, the DMA FIFO is considered full if it cannot accept another full DMA transfer of sixteen pixels. Thus, the DMA FIFO is considered full if it has more than 48 pixels in it.

Whenever the DMA FIFO is not empty, the FIFO read control state machine reads out an entry (e.g. 32 bits, or 4 pixels) from the DMA FIFO and generates the proper select signals to conversion means. Working together the FIFO read control state machine and the conversion means serialize the four packed pixels into a stream of single pixels.

This stream of signal pixels can be fed as the input to either the correlator 606 or the histogrammer 604. The FIFO read control state machine also generates a "valid data" output that indicates when the stream of single pixels is active. This signal is intended as an enable for the correlator 606 or histogrammer 604. Finally, the DMA interface 602 provides a signal that indicates when it is empty, an indicator that it has no more data in its DMA FIFO being serialized by the FIFO read control state machine and the multiplexer.

Other additional features of the correlator DMA interface 622 includes a DMA counter and a DMA request state machine. The DMA counter is preferably programmed with the number of transfers that will occur in the overall DMA transfer (typically a full image). When the binary correlator 606 is running on its own DMA channel, the DMA request state machine will generate a DMA request to the processor whenever the correlator DMA FIFO is not full. The DMA counter indicates there are more transfers required, and there are no outstanding DMA requests, its previous requests have been acknowledged. Additionally, the DMA interface empty signal for the correlator DMA interface 622 will not be asserted unless the DMA counter indicates there are no more transfers required.

The pixel histogrammer 604 further includes an input multiplexer 624, a dual-port block RAM 626 (preferably of size 256×19 bit), an incrementer 628, and a plurality of flip-flops to delay key signals. The input multiplexer 624 decides whether the histogram pixel input or the processor address should access the block RAM 626. When the histogrammer 604 is enabled, the pixel input addresses the block RAM 626. However, when the histogrammer 604 is disabled, the processor 400 can address the block RAM 626 in order to read and write from the RAM 626. Prior to starting a histogram, all of the locations in the block RAM 626 are preferably cleared. When the histogrammer 604 is enabled, each pixel addresses the block RAM 626. This causes the RAM entry for that pixel to be read out. That value is then incremented and stored back into the block RAM 626 on the other port. The timing is designed to make sure that the incremented value is saved before the next pixel arrives. That allows for two pixels in a row to be the same without causing a problem.

Turning to the binary correlator 606, it preferably includes a row storage element 632, a 16×16 pixel binary correlator 634, a correlator location tracker and decoder module 636, a correlation thresholder 638, a correlation peak RAM address counter 640 and a correlation peak RAM 642.

Generally, the binary correlator 606 provides a high-speed hardware-based means of searching for register marks in an image. The binary correlator 606 uses a 16×16 kernel which contains a binary image of the register mark. The correlator 606 binarizes the image and, in effect, passes a template over the entire image. For each possible template location within the image, the correlator 606 computes the correlation between the template and the image. Locations with a correlation value higher than a programmable threshold are saved.

Figure 11:
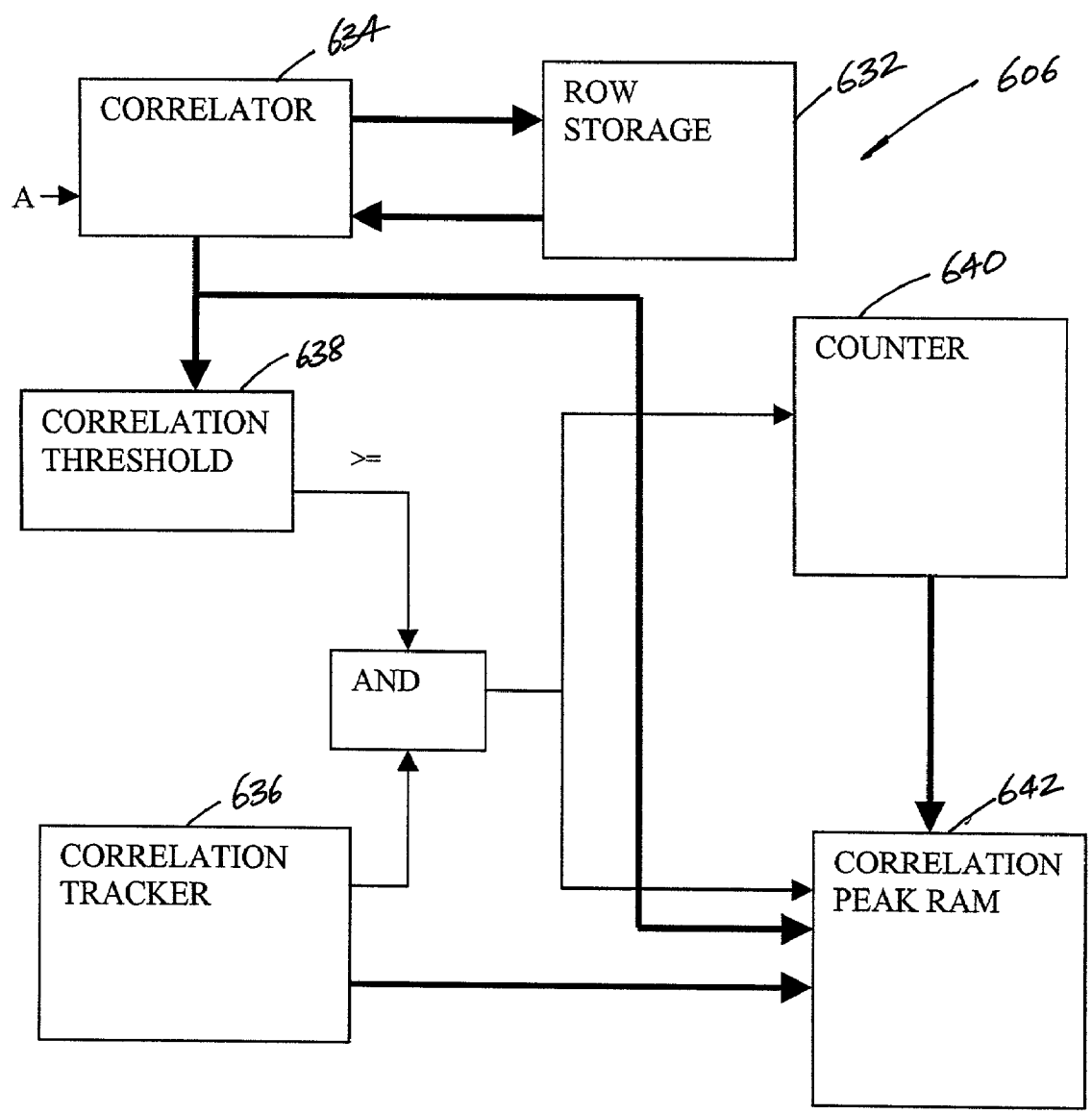
FIG. 11 is a block diagram of a binary correlator.

Turning now to FIG. 11, the binary correlator is shown in more detail. The binary correlator receives 8-bit image data from the DMA interface at arrow A. The HIP FPGA module 410 binarizes the image with the binarizer 610, and passes that data into a 16×16 correlator 634. The data enters the lower right corner of the correlator 634. With each new pixel, the data in the correlator 634 is shifted to the left, effectively moving the template to the right within the image. As data passes out of the left edge of the template, it is sent to the row-storage memory element 632. The row-storage size is fixed at 15×640, which limits the operation of the correlator 634 to images that are 656 pixels wide. In an alternative embodiment, the row-storage size is made variable.

The correlation value is calculated at each template location. If the correlation value meets or exceeds the correlation threshold stored in the correlation thresholder 638 and the template is within the area of interest in the image, the correlation and template location are saved in the correlation peak RAM 642. The template position tracker 636 contains a row and column counter to track the position of the lower right corner of the template. It also contains registers that define the area of interest. The correlation peak RAM address counter 640 increments when each peak is stored in RAM 642. The correlation peak RAM 642 preferably stores 1024 entries.

The correlator 634 uses a kernel, the image data, and a kernel mask to calculate the binary correlation. For example, the kernel is a 16×16 square that contains a binary representation of a golden template mark. The mask is used to specify which pixels within the 16×16 square will be used for correlation and which pixels will be ignored. The image data is a 16×16 section of the image that is being correlated upon. In general, binary correlation is simply counting the number of bits within the image data that match the bits in the template. Bits that are masked out are ignored. On a pixel by pixel basis, the logic function is:

Corr=(Kern XNOR ImageData) AND Mask,

Where Mask=0 means ignore the pixel and Mask=1 means include the pixel.

This results in a truth table as follows:

| Mask | Kernel | Image Data | Correlation | Notes |
|---|---|---|---|---|
| 0 | 0 | 0 | 0 | Masked |
| 0 | 0 | 1 | 0 | Masked |
| 0 | 1 | 0 | 0 | Masked |
| 0 | 1 | 1 | 0 | Masked |
| 1 | 0 | 0 | 1 | Same |
| 1 | 0 | 1 | 0 | Different |
| 1 | 1 | 0 | 0 | Different |
| 1 | 1 | 1 | 1 | Same |

One way to implement the correlation function is to build the mask and kernel each out of sixteen 16-bit registers, one register for each row. The image data is held in sixteen 16-bit shift registers to facilitate moving the kernel across the image. In each kernel location, the correlation logic function is applied combinatorially on a per-pixel basis to all pixels in the template. The number of matching bits is added with some type of adder tree. With this implementation, the mask and kernel will each be programmed with a binary bitmap.

Figure 12:
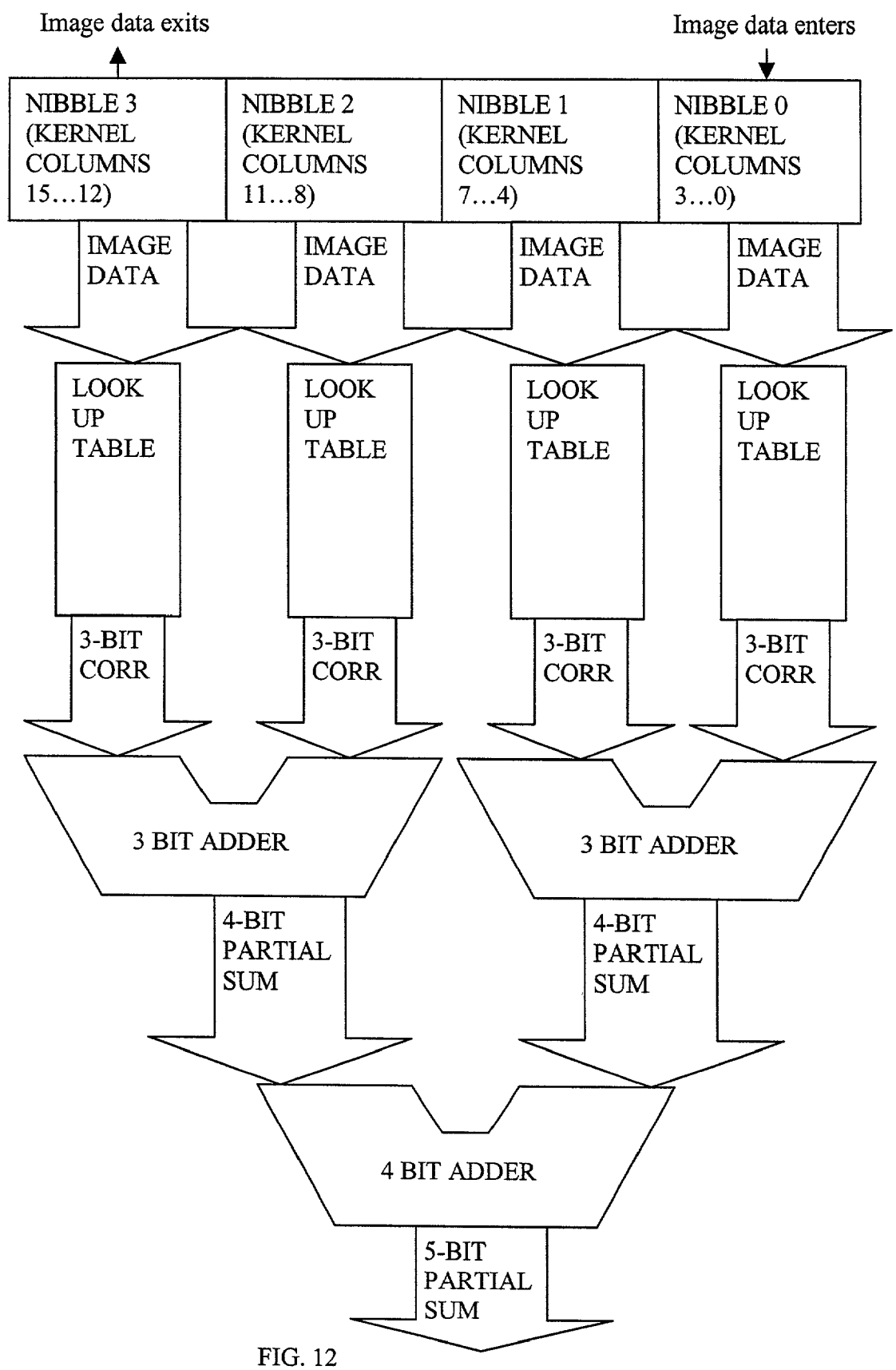
FIG. 12 is a schematic view of a shift register kernel.

The preferred embodiment uses look up tables storing the image data in sixteen 16-bit shift registers, one for each row of the kernel. One row, and the associated logic, is shown in FIG. 12. Each 4-bit nibble of each shift register feeds a 16×3 look up table. Each nibble represents one 4-bit segment of the overall kernel. The shape, correlation function, and mask appropriate for each nibble must be programmed into the look up table. The outputs of all nibble look up tables are added together within rows to compute row correlations. The partial sums for all kernel-row correlators are added together for one overall correlation result.

With the look-up-table implementation, the shape of the template mark, the mask, even the correlation function, are all programmed within the look-up-tables. In essence, the preferred binary correlator is a look-up-table based image processor that sums up its look-up-table results.

Turning back to FIGS. 6 and 7, predefined color register marks 304 and pattern 306 are illustrated. However, as earlier noted, the invention supports the use of programmable color register marks. These marks and patterns can therefore be defined and designed by the used to suit individual application, and allow flexibility.

Figure 13:
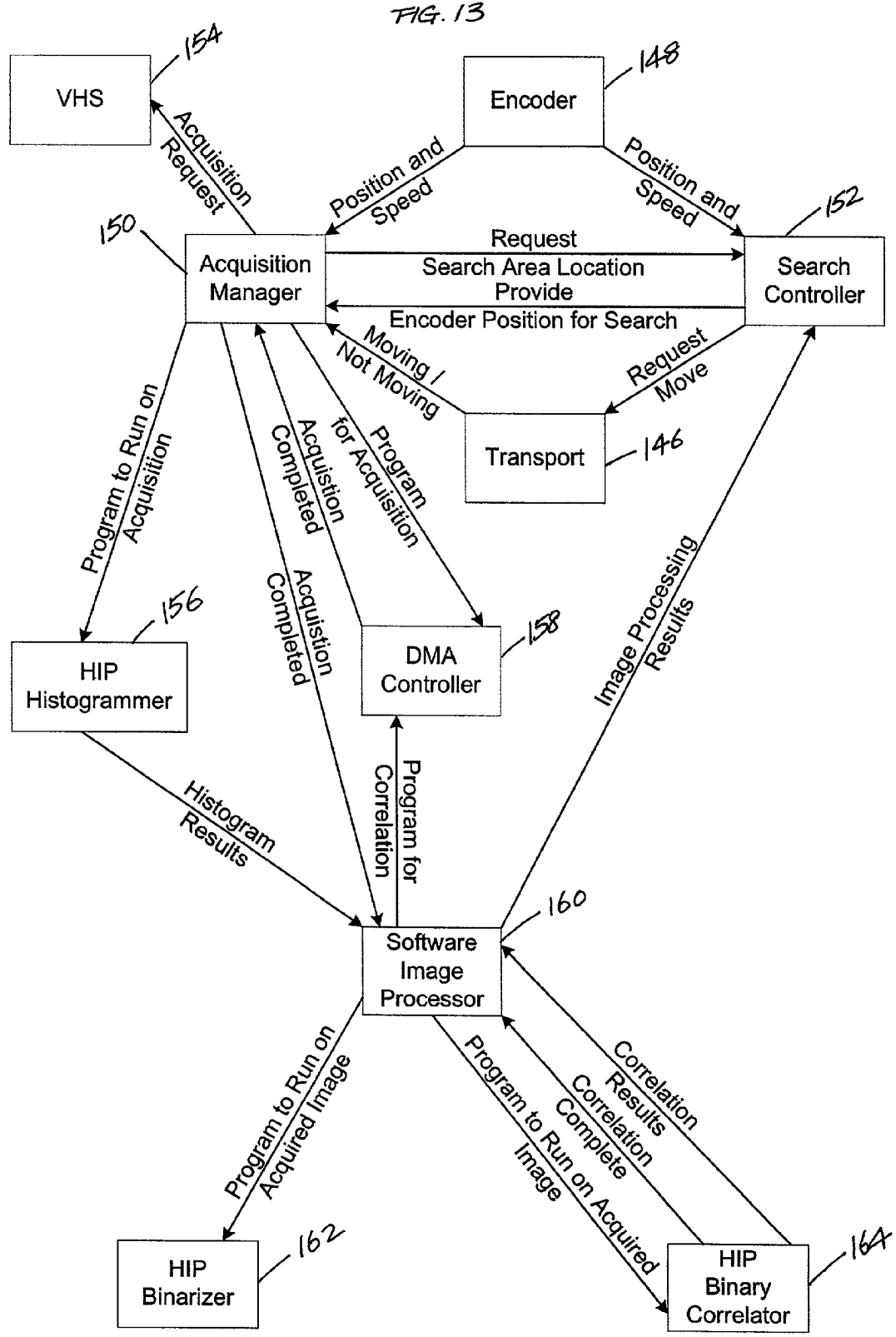
FIG. 13 is a state diagram illustrating the operation of a registration control system.

Referring now to FIG. 13, a state diagram of the registration control system 100 according to the present invention. As long as a transport system 146 (104 of FIG. 1) is not moving, and the press 108 (FIG. 1) is above a minimum speed, an acquisition manager 150 starts to request a plurality of search areas from the search controller 152, and starts to examine one search area at a time. The search controller 152 then uses the present encoder position, and the press speed (along with a list of search areas that have been searched) to pick the next desired area (out of the list the search areas that have not been searched) at which the camera assembly 102 is to take a picture.

The acquisition manager 150 simultaneously programs an image acquisition at the search area by a plurality of programming steps. These steps include programming the VHS 154 (412 of FIG. 8) with an acquisition request that provides the encoder count for the picture, programming a HIP pixel histogrammer 156 (410 of FIG. 8) to run on the image as it is unloaded from the VHS 154, and programming a DMA controller 158 (422 of FIG. 8) to conduct the data transfer for acquisition.

The VHS 154 then waits for the encoder 148 to reach the proper area by counting a series of encoder pulses. The VHS 154 sends a pulse to the strobe trigger 223 (FIG. 9), and the strobe bulb 220 is then activated to illuminate the web 106. The reflected image of the illuminated web is detected by the sensor 214. The VHS 154 in conjunction with the DMA controller 158 then begin the transfer of image to memory, while a histogram is computed on the image by the HIP 156.

The DMA controller 158 signals the acquisition manager 150 when the full image is acquired and stored in memory. The acquisition manager 150 then signals a software image processor 160 that a new image has been acquired. Meanwhile the acquisition manager 150 repeats the step of requesting the next desired search area discussed earlier.

The software image processor 160 obtains the results from the HIP histogrammer, and calculates a plurality of initial conditions for a HIP binarizer 162 (610 FIG. 10) based upon the histogram obtained. The software image processor 160 then programs the HIP binary correlator 164 with data needed to run the correlation, the binarizer 162 with the initial conditions, and the DMA controller 158 to conduct the data transfer for the HIP 156. The software image processor 160 then waits for the binary correlator 164 to be complete. Once the HIP binary correlator 164 completes the binary correlation 164, it then notifies the software image processor 160.

The software image processor 160 then obtains the correlation results from the HIP binary correlator 164, and releases the HIP to process the next image. The software image processor 160 also uses the correlation results and grayscale image data to search for the marks. The software image processor 160 notifies the search controller 152 of image processing results based on a plurality of pattern recognition results. If a partial pattern is found, the search controller 152 moves the transport system 146 to determine if a full pattern is found. If a full pattern is found, the search controller 152 stops searching circumferentially and starts tracking on it. If no pattern is found, the search controller 152 continues the circumferential search.

What is claimed is:

1. A camera assembly for use in scanning a paper substrate of a printing press, said assembly comprising:
   a housing;
   a camera mounted within said housing;
   a light source mounted within said housing; and
   two mirrors positioned within said housing and positioned symmetrically with respect to a plane that is perpendicular to the paper substrate of the printing press to direct light in two distinct paths that remain separate from the same said light source to the paper substrate to provide uniform illumination of a portion of the paper substrate using a single light source, wherein light is then reflected from that portion of the paper substrate to the camera.

2. The camera assembly of claim 1 wherein said camera is a COD type camera including a lens, and the plane perpendicular to the paper substrate passes through the lens and the light source.

3. The camera assembly of claim 2 wherein said light source is a strobe type light source, and an axis of the light source is parallel to an axis of the lens.

4. The camera assembly of claim 1 wherein at least one of said mirrors is flat.

5. The camera assembly of claim 1 wherein said mirrors are positioned on each side of said light source.

6. A lighting assembly for a camera positioned adjacent a paper substrate of a printing press, said assembly comprising:
   a single strobe light source; and
   two mirrors positioned adjacent the same said light source, equidistant to a first plane defined by a surface of the paper substrate, and symmetrical with respect to a second plane that is perpendicular to the paper substrate and that passes through said single light source without passing through the two mirrors to direct light in two distinct paths of equal length of uniform illumination from the same said light source to the paper substrate to provide uniform illumination of a portion of the paper substrate using the single light source, wherein light is then reflected from that portion of the paper substrate to a camera.

7. A method of creating dual light paths directed toward a paper substrate of a printing press, said method comprising:
   supplying a light source;
   supplying two mirrors; and
   positioning said mirrors adjacent the same said light source and at symmetrical and substantially equal distances from the paper substrate such that light from the same said light source strikes said mirrors and light is redirected in two distinct light paths toward the paper substrate to provide uniform illumination of a portion of the paper substrate using a single light source, wherein light is then reflected from the paper substrate to a camera.

8. The method of claim 7 wherein said light source includes a strobe bulb.

9. The method of claim 7 wherein said mirrors are flat.

10. The method of claim 7 wherein each light path has an illumination intensity that is substantially the same.

11. A method for creating dual light paths of uniform illumination directed toward a paper substrate of a printing press, said method comprising:
    supplying a single light source; and
    positioning at least two mirrors adjacent said single light source and symmetrically with respect to a plane that is perpendicular to the paper substrate of the printing press and passes through said single light source, such that the at least two mirrors are positioned on opposite sides of the plane and light from said single light source is split into dual light paths of equal length of uniform, non-collimated illumination and directed toward the substrate by said mirrors to provide uniform illumination of a portion of the paper substrate, wherein light is then reflected from that portion of the paper substrate to a camera.

12. The method of claim 11 wherein said single light source is of the strobe type.

13. The method of claim 11 wherein said at least two mirrors is two mirrors.

14. The method of claim 11 wherein at least one of said at least two mirrors is flat.

15. The lighting assembly of claim 6 wherein said light source is a Xenon strobe bulb.

16. The lighting assembly of claim 6 wherein said two mirrors are flat.

17. The lighting assembly of claim 6 wherein said two mirrors are positioned within said assembly to direct light from two different directions from said light source to the paper substrate.

* * * * *